Figure 1:
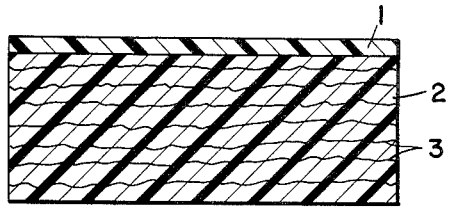

March 1, 1966 H. CLARK ETAL 3,238,077
PROCESS OF BONDING A POLYOLEFIN LAYER LAMINATE WHICH HAS
BEEN PARTIALLY CURED TO A B-STAGE PRODUCT
Filed Jan. 18, 1961

INVENTORS
HADDEN CLARK
RICHARD G. ADAMS
WILLIAM H. SMYERS
WILLIAM JOHN GILBERT MC CULLOCH
OBER C. SLOTTERBECK DECEASED
BY LEALIA G. SLOTTERBECK EXECUTRIX

By _____ Patent Attorney

United States Patent Office 3,238,077
Patented Mar. 1, 1966

3,238,077
PROCESS OF BONDING A POLYOLEFIN LAYER LAMINATE WHICH HAS BEEN PARTIALLY CURED TO A B-STAGE PRODUCT
Hadden Clark, Somerset, Richard G. Adams, Upper Montclair, William H. Smyers, Westfield, William John Gilbert McCulloch, Plainfield, N.J., and Ober C. Slotterbeck, deceased, late of Clark, N.J., by Lealia G. Slotterbeck, executrix, Clark, N.J., assignors to Esso Research and Engineering Company, a corporation of Delaware
Filed Jan. 18, 1961, Ser. No. 83,512
10 Claims. (Cl. 156—60)

This invention relates to a method for chemically bonding a polyolefin layer to a polydiolefin laminate which has been partially cured to a B-stage product. More particularly, it is concerned with the unitary cured coated laminate therefrom.

It is known that reinforcing elements, e.g., glass cloth, can be impregnated with a polydiolefin resin mix and cured at elevated temperatures to provide a solid reinforced plastic laminate. In the past, a polyolefin, e.g., polyethylene, film has been applied to the cured polydiolefin laminate. However, inferior adhesion results between these two components. Furthermore, it has been found that other problems occur if a polyethylene layer is applied to uncured glass cloth layers which have been impregnated with a liquid polydiolefin mix. During co-curing, the liquid mix diffuses throughout the polyethylene layer which causes its outer surface to lose its thermoplastic bonding properties. Therefore, the end product cannot be employed in certain commercial areas, e.g., television printed circuits, since materials, such as oxide-coated copper foil, will not adhere to the cured polyethylene layer.

It has now been discovered that the aforementioned problems can be alleviated by applying the polyolefin film to a B-stage polydiolefin laminate. Thus, in accordance with one embodiment of this invention, a resinifiable polymeric mix is prepared with a curable polydiolefin therein. A reinforcing element is impregnated with this mix and partially cured to a B-stage laminate. A polyolefin layer is then applied to this B-stage laminate. These two components are subsequently cured to provide a unitary product in which the outside surface of the polyolefin layer is thermoplastic and is capable of being adhered to a metallic coil.

The curable liquid polymers included in the resinifiable mix of this invention are prepared from conjugated diolefins, which have 4 to 6 carbon atoms per molecule, e.g., butadiene, hexadiene, isoprene, dimethyl butadiene, piperylene, and methyl pentadiene. Such diolefins may be copolymerized with minor amounts of ethylenically unsaturated monomers, e.g., styrene, acrylonitrile, methyl vinyl ketone, or with styrenes having alkyl groups substituted on the ring, e.g., paramethyl styrene, and dimethyl styrene. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymers of butadiene with styrene. Polymerization is carried out in a reaction diluent at temperatures from about 25° C. to 105° C. with about 0.5 to 5 parts of finely divided sodium (of about 1 to 100 microns in diameter) per 100 parts of monomers used. A diluent, which should boil between about −15° C. and 200° C., should be used in amounts ranging from 100 to 500 parts per 100 parts of monomers; preferred diluents are aliphatic hydrocarbons such as solvent naphtha or straight-run mineral spirits such as Varsol. In order to obtain a water white product, a co-diluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises when tested as a 50% solution in Varsol. The preparation of this oil in the presence of an alkali metal with at least 40% side vinyl therein is described in U.S. Patent 2,762,851, which is incorporated herein by reference.

Besides the curable polydiolefin heretofore described, the resinifiable mix may also contain other monomeric cross-linking agents. Such monomers include the vinyl aromatics, such as styrene, the vinyl toluenes, the dimethyl styrenes, the halogenated styrenes, e.g., 2,4-dichlorostyrene; acrylic and methacrylic acid esters of monohydric alcohols, such as butyl methacrylate; alkyl fumarates, such as diethyl fumarate; and allyl esters, such as allyl acetate; and vinyl esters, such as vinyl stearate; an acrylic acid ester of a polyhydric alcohol, and mixtures thereof. These additional crosslinking agents may be present within the range of 0 to 70% of the curable liquid mix, preferably 30 to 50%. A small amount, e.g., 1–6 per hundred parts by weight of resin (p.h.r) of difunctional crosslinker may be used, e.g., divinyl benzene; or dimethacrylates, e.g., ethylene dimethacrylate; or diallyl phthalate.

A catalyst is also incorporated in the resinifiable mix within the range of 0.5 to 10 parts, preferably 2 to 4 parts. The catalyst is advantageously a free radical or peroxide type such as dialkyl or aralkyl peroxides, e.g., dicumyl peroxide and ditertiary butyl peroxide; and alkyl perester peroxides, e.g., ditertiary butyl diperphthalate and tertriary butyl perbenzoate. A mixed catalyst consisting of dicumyl peroxide and ditertiary butyl peroxide is preferred. Benzoyl peroxide may also be employed in the mix, preferably in 0.5 to 1.0% concentration.

It may be advantageous although not necessary to include natural rubber; a polyvinyl compound, e.g., divinyl benzene; and/or a blocked phenol, e.g., 2,6-di-t-butyl para cresol in this resinifiable polymeric mix. The polyvinyl compounds have the general structure as indicated hereinbelow:

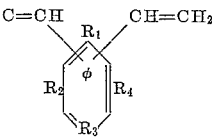

wherein $R_1$, $R_2$, $R_3$, and $R_4$ are each independently selected from the group consisting of hydrogen, halogens, alkyl groups, and a vinyl group; and $\phi$ is an aromatic nucleus such as that of benzene, naphthalene, biphenyl, and phenanthrene. Illustrated herebelow is the general formula for a sterically blocked phenol:

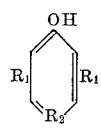

wherein each $R_1$ is independently selected from the group consisting of a tertiary alkyl radical containing not more than 8 carbon atoms and another blocked phenol which may be attached through the tertiary alkyl group; and $R_2$ is selected from the group consisting of hydrogen, an alkyl radical having 1 to 4 carbon atoms and another blocked phenol group which may be attached directly to the para carbon atom or through one alkylene group. Therefore, the resinifiable mix generally comprises 0 to 5 parts of divinyl benzene or similar compounds; 0 to 1.0 parts of 2,6-di-t-butyl para cresol or similar compounds; and 0 to 5.0 parts of natural rubber.

The reinforcing elements that are applicable to this invention include such items as mineral materials, e.g., glass fiber, asbestos, mica, rock, and Celite; vegetable materials, e.g., cotton, linen, and rayon; organic materials, e.g., silk, hair, nylon, and Orlon; and metallic materials, e.g., iron, aluminum, and copper. Reinforcing elements generally comprise 35–80%. However, the preferred material is glass fiber. In accordance with this invention, glass fiber is defined as any fibrous glass unit to include filament yarns, rovings, reinforcing mats, staple yarns, woven fabrics, and chopped fibers. A protective size may be applied to glass fibers. Examples of sizes which can be used are as follows: polyesters; polyvinyl acetate; rubbers, such as, the polyisoprene, copolymers of isobutylene with isoprene, and copolymers of butadiene with styrene. It is preferable to remove the sizing in many cases prior to contacting the glass with the resin. It is within the scope of this invention to use glass fiber which has been treated with an unsaturated organic halo silane, having the formula $R_nSiX_{4-n}$ wherein R is vinyl or allyl group, n is a positive integer equal to 1, 2, or 3, and X is halogen. It is also possible, although not essential to incorporate 0.1 to 5 parts of a silane ester in the resinifiable mix which has the general formula $R_nSi(OR_1)_{4-n}$, wherein R is an unsaturated group, e.g., vinyl, allyl, or methallyl group; n is a positive integer equal to 1, 2, or 3; and $R_1$ is an alkyl or aryl group or substitutes thereof. It is believed that the above-described silanes react with the hydroxyl groups on the glass surface. The unsaturated or vinyl portion of the molecule, bound to the glass through the silicon atom, reacts with the polymer during the curing step, thus effectively bonding the curable polymer and the glass fiber.

The reinforcing elements are then laminated with the aforementioned resinifiable polymer mix. A laminate, according to this invention, is defined as a composite mass of a reinforcing agent and a thermosetting resin. This, therefore, includes layers of cloth and resin; fibers embedded in a resin; and fibers saturated with resin and formed into a hollow cylindrical pipe. Accordingly, lamination can be accomplished by any known procedure. For example, the resin mix can be combined with glass cloth by brush impregnation; by being poured into the center of several piles of dry cloth assembled on cellophane-covered glass plate or into a Mylar-covered metal mold, etc.; by spray up with chopped roving; and by dipping the cloth into the resin mix.

Thus, one method used in the manufacture of solid rectangular sheets, is to form multiple alternate layers of curable polymer mix and glass fiber. After the desired thickness is obtained, the sheet is partially cured to a B-stage product, as described in subsequent paragraphs herebelow. Another method can be used for the manufacture of cylindrical hollow pipes. Glass fibers can be dipped in the curable polymer mix and wound about a steel mandrel. The fiber rovings, e.g., glass fibers, are wound at an angle to the axis of the mandrel circumferentially in superimposed layers to form a peripheral shell of the pipe. After the desired shape is obtained, the wrapping is partially cured to form a B-stage item.

The resinifiable polymeric mix impregnated upon the reinforcing elements can be partially cured to a B-stage product by any known manner, but a preferred procedure is to place in a press mold and bake at a temperature range of 250° to 350° F., preferably 265° to 335° F., for between 1 minute and 2 hours, preferably 1 to 90 minutes, under pressures from 0 p.s.i.g. to 500 p.s.i.g., preferably 30 to 200 p.s.i.g. Thin sections (1/64 inch) are partially cured at higher temperatures for shorter periods of time, e.g., 1/4 to 60 minutes, at 300° to 500° F. in an air-circulating oven. This curing procedure is different from the one used in preparing a completely cured laminate. A hard laminate can be obtained by varying the temperature inversely with time. For example, at a low temperature, e.g., 270° F., a long time is required to produce a completely cured product, e.g., 1 to 24 hours. Similarly, at a high temperature of 350° F., a short time, e.g., 20 to 60 minutes, is required. However, in this invention, a relatively low temperature and a relatively short time are employed; and, therefore, only a B-stage laminate is obtained. The B-stage resin or laminate is not the same as a completely cured, resin or laminate since the chemical and physical properties are inherently different as shown below:

| Physical Properties | B-stage cure | Complete Cure |
|---|---|---|
| Hardness, Shore D (5 sec. yield): | | |
| Resin | 2–40 | 80–97 |
| Resin with reinforcing agent, e.g., random glass fibers | 8–60 | 82–98 |
| Extrusion-Parallel Plates at 200 p.s.i. | 30–500% | 0–0.5% |
| Moldability (qualitative) | (¹) | None |
| Thermoplasticity-Hardness—Decrease for 75 to 350° F. range (Shore D units) | 3–25 | 30–45 |
| Flexural strength, p.s.i. × 10⁻³—Reinforced resin with random glass fibers | 0.1–15 | 18–35 |
| Chemical Properties—Swelling (weight gain after 2 hrs. exposure to CCl₄ at 75° F.) | 123% | 0.0% |

¹ Good to excellent.

In accordance with the instant invention, a polyolefin layer is applied to the above B-staged polydiolefin laminate. The thickness of this B-stage product may vary from a few mils to several inches, but is generally about 10 mils to ½ inch and a single reinforced polydiolefin layer is preferably between 1 and 50 mils. Glass cloth usually is about 5 to 10 mils in thickness, whereas glass mat and swirl range from about 20 to 50 mils.

The polyolefin layers may have a thickness of about 1 mil to several inches. The polyolefins employed herein are prepared from a monomer which contains 2 to 12 carbon atoms per molecule, e.g., polyethylene, polypropylene, polybutene, polyheptene, or ethylene-propylene copolymers, ethylene-styrene copolymers and the like. The polyolefin, polyethylene, being preferred, can be prepared by any known method. A suitable method is the polymerization of ethylene at low pressures, e.g., 0 to 500 p.s.i.g., and low temperature, e.g., 0 to 100° C., in the presence of a catalyst. The catalysts used in this polymerization reaction are solid, insoluble reaction products obtained by reducing a reducible heavy transition metal compound, the metal component of which is taken from groups IVB, VIB, or VIII or manganese with a reducing organometallic compound of an alkali, alkaline earth, rare earth, or zinc metal compound. The catalyst can also be prepared by reducing an appropriate metal compound with either metallic aluminum, or mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR′AlX wherein R, R′, and X preferably are alkyl groups having from 2 to 8 carbon atoms, although X can be hydrogen or halogen, preferably chlorine. In addition to the catalyst, an inert hydrocarbon solvent, which is preferably a $C_3$ to $C_{18}$ paraffin, e.g., isopentane, n-heptane, and the like, may be used in the polymerization. The end product, e.g., high-density polyethylene, generally has a molecular weight in the range of 50,000 to 500,000 or more. These polyolefins are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference.

This invention is also applicable to low-density polyolefin, made by polymerization at about 100 to 400° C., under high pressure, e.g., 500 to 3,000 atmospheres, and preferably with a controlled trace of oxygen as catalyst having a molecular weight between 1,000 and 30,000, e.g., 20,000.

The B-stage laminate with the polyolefin thereon is subsequently placed in a press or mold and completely cured at a temperature between about 250 and 400° F., preferably 300 to 350° F., inversely for about 24 hours to 5 minutes at a pressure between 0 and 3,000 p.s.i.g. The unitary end product therefrom is a hard, solid thermoset polydiolefin reinforced plastic which is chemically bonded to at least one polyolefin layer. Furthermore, the outside surface of the polyolefin, not contiguous to the laminate, has retained its thermoplastic properties. Therefore, a plurality of these laminates can be heat-bonded together; or a polypropylene sheet may be heat-bonded to a polyethylene-coated laminate of this invention. Epoxy resins, which normally interfere with the desired peroxide cure of the polydiolefin resin laminate, can now be applied to the polyethylene coating on such a laminate. It is now possible to utilize the end product of this invention for solid rectangular laminate sheets or slabs, pipes, tanks, drums, or other containers, and molded or extruded articles.

Alternatively, to the above method for providing the desired end product, the resinifiable mix can be cured to form a varnish-type prepolymer or graft polymer solution in a volatile inert solvent, by heating at a temperature between 150° and 300° F., preferably about 200° and 275° F. for 15 to 300 minutes. The graft polymer is not the same as a B-stage cure and/or a complete cure. The graft polymer has only two dimensional crosslinking whereas the B-stage has three dimensional crosslinking. Furthermore, the graft polymer is soluble in hydrocarbon solvents, e.g., toluene, xylene, close-cut naphthas, and Varsol; in contrast, the B-stage is not soluble in these compounds. The comparison of properties of the three stages are demonstrated herebelow.

| Graft polymer | B-stage | Complete cure |
|---|---|---|
| Made in a solvent. Viscosity between 1 and 20 poise at 50% NVM. | Thermoplastic. Soft gel, swells in solvents and therefore not very soluble in solvents. | Hard solid, affected very slightly by, or inert to, solvents. |

The reinforcing elements, e.g., paper and cloth, or glass cloth, etc., in this alternative procedure are impregnated with this prepolymer or graft polymer solution and dried in an air-circulating oven at a temperature of room temperature for 325° F. for 30 seconds to 2 hours. A non-tacky prepreg is obtained therefrom. Depending upon the conditions employed, this prepreg is a dried graft polymer, e.g., with a temperature of 250° F. and below; or is a B-stage product, e.g., with a temperature above 250° F. One or more layers of this prepreg can then be coated with a polyolefin layer and cured similarly to the procedures heretofore described to provide a unitary product therefrom.

It should be noted that high density polyethylene and crystalline polypropylene, are high melting point polymers which are difficult to process and to calender in thin films or to heat-seal onto paper or onto other polymers. However, a sheet of polypropylene having a thin film of low density polyethylene calendered or hot pressed on each side of it can be heat sealed to paper. A film of Parapol, a styrene-isobutylene copolymer, is thermoplastic and makes an excellent coating for one or both sides of either polypropylene or high density polyethylene. Low density polyethylene films on one or both sides of high density polyethylene film also make a composite laminate. The Parapol film can easily be applied as a solution in toluene at room temperature and then dried in a vacuum oven below the melting point of the high density polyethylene. Likewise, a toluene solution of a polydiolefin, preferably with styrene grafted thereon, may be used to coat the polyethylene or polypropylene. A peroxy catalyst may be included and the product therefrom may be cured by heating.

It is also within the scope of the instant invention to blend 1 to 50 parts of a polyolefin directly into a polydiolefin resin mix. The blend can be applied to a reinforcing element and cured to a laminate in accordance with procedures heretofore described. However, this blend may also be used to provide a solid resin without reinforcement therein. Accordingly, a polydiolefin resinifiable mix can be formulated with polyolefins and cured to impart increased modulus to the resultant blend; however, other hydrocarbon thermosetting resins might be used. Improved impact is also obtained by incorporating therein small amounts of synthetic or natural rubber, silicon rubber, and other resins having good impact strength in lieu thereof or addition to the polyolefin.

Figure 2:
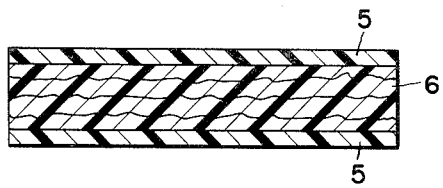
Figure 3:
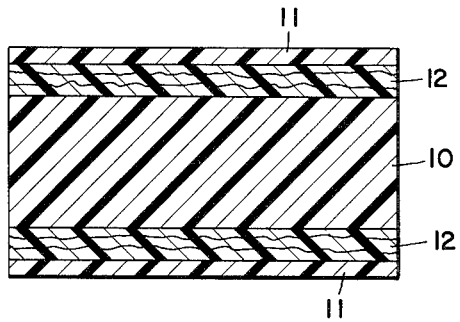
Figure 4:
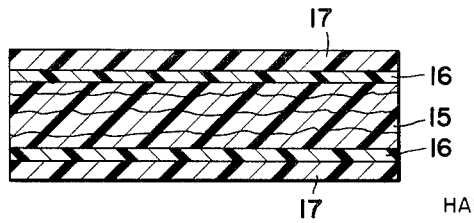

This invention may be fully understood in conjunction with the accompanying drawings in which FIGURE 1 illustrates a polyolefin layer 1 applied to a B-stage polydiolefin layer or prepreg layer 2 having reinforcing elements 3 therein. FIGURE 2 demonstrates polyolefin layers 5, being coated upon both sides of prepreg 6, comprising reinforcing elements impregnated with a polydiolefin. FIGURE 3 shows prepreg layer 12 with a relatively thick polyolefin layer 10 therebetween and with the exterior sides having relatively thin polyolefin coatings 11 thereon. FIGURE 4 exemplifies a prepreg layer 15 comprising a polydiolefin resin with a reinforcing element therein which has a polyethylene layer 16 on both sides thereof. Furthermore, a polypropylene, polyisobutylene or butyl rubber layer 17 can be applied to the outside surface of the aforementioned polyethylene layer.

The following examples are submitted to illustrate but not to limit this invention. Unless otherwise indicated, all parts and percentages in the specification are based upon weight.

EXAMPLE I

A polymeric oil was provided from the compounds indicated herebelow:

| | Parts |
|---|---|
| Butadiene-1,3 | 80 |
| Styrene | 20 |
| Varsol[1] | 200 |
| Dioxane | 40 |
| Isopropanol | 0.2 |
| Sodium[1] | 1.5 |

[1] Straight-run mineral spirits; API gravity, 49.0; flash, 105° F.; boiling range, 150° to 200° C.; solvent powder, 33–37 Kauri-Butanol value (reference scale: Benzene, 100 K.B. value; n-heptane, 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.2 poises at 50% NVM in Varsol solution and the nonvolatile portion thereof had an average molecular weight of about 10,000.

(A) A glass fiber-reinforced resin laminate was made by laying 12 plies of #128 (6 mil) glass fiber cloth 12 by 12 inches in size in a ⅛ by 12 by 12 inch mold. First a film of Mylar was put on the bottom plate of the mold.

Then a layer of wet resin mix was applied which consisted of:

| Compound | Parts by weight |
|---|---|
| Copolymer oil (as described) | 50 |
| Styrene | 50 |
| DVB (divinyl benzene) | 2 |
| BPO (benzoyl peroxide) | 0.25 |
| Dicup (dicumyl peroxide) | 2 |
| DTBP (di-t-butyl peroxide) | 1 |
| Crepe rubber | 2 |

One layer of glass cloth at a time was impregnated, rubbing carefully to remove entrapped air, and more wet resin mix was applied alternately when necessary to impregnate each layer of glass cloth. After the twelfth ply, a thin (about 1½ mils) sheet of polyethylene (ordinary low density) was laid on top, and finally covered with a sheet of Mylar and the top steel plate of the mold.

The mold was then put in a press and cured, first 6 minutes at 265° F., and then 40 minutes at 325° F., using a pressure of about 100 p.s.i.g. After curing and cooling, the resultant strong rigid laminate was hacksawed into four equal squares, each having a cured resin finish on one side, and a polyethylene film on the other side.

(B) An attempt was made to apply a strip of oxide-coated copper foil (which had been dried in a hot air oven at 250° F. for 10 minutes) by means of a film of LD (low density) polyethylene (of about 20,000 mol. wt.) to the cured resin side of one of these four panels. The two sheet materials were hot-pressed onto the panel for 10 minutes at about 350° F. at about 400 p.s.i. However, the polyethylene did not stick to the previously cured butadiene-styrene copolymer oil resin panel, though the oxide-coated copper foil did stick to the polyethylene.

(C) An attempt was also made to heat-bond a strip of oxide-coated copper foil onto the polyethylene side of one of the four small pre-cured panels described in (A) above. However, after cooling the bond was unsatisfactory. This shows that during the curing of a wet resin lay-up of the type described, with polyethylene film overlay, the polyethylene becomes modified and loses its thermoplastic heat-bonding properties.

(D) Another glass fiber-reinforced resin laminate (10 by 10 inches) was made as in (A) above, but removed from the press at the B-stage cure, e.g., after the first six minutes at 265° F. A strip, about 1 by 4 inches, of oxide-coated copper foil which had been bonded on one side with a thin (1½ mils) film of polyethylene (LD) was applied to one corner of this 10 by 10 inch B-staged panel. When later given the same final cure of 40 minutes at 325° F., the copper foil, polyethylene and the reinforced hydrocarbon resin panel were found to be all tightly bonded into a unitary laminate. The B-staged resin layer and the polyethylene form a chemical bond when cured.

EXAMPLES II and III

Another B-staged resin glass cloth laminate, as per Example I(D), was overlayed with a 4-mil self-supporting film of HD (high-density) polyethylene and press-cured as in Example I(D) above. An excellent bond was obtained. The same procedure was also followed for bonding HD (high-density) polyethylene to a B-staged paper laminate, using the same wet resin mix described in Example I(A). On curing, an excellent bond was obtained. This is a good way of improving the moisture resistance of paper or glass cloth panels in which the fibrous reinforcing is bonded with a resinified butadiene polymer oil.

EXAMPLE IX AND V

Glass cloth and paper laminates were made and coated on one side with HD polyethylene, similar to Examples II and III, except that instead of using the wet resin lay-up, the sheets of glass cloth, or paper, were impregnated in a volatile solvent solution of a slightly cured resin and catalyst, with a trace of inhibitor, dried and laid up as dry "prepreg" layers.

The pre-polymer solution was made by first grafting styrene onto a polybutadiene oil of about 10,000 mol. wt. and about 60–70% side vinyl groups, using these proportions:

| | Pounds |
|---|---|
| Polybutadiene | 84 |
| Tolene | 84 |
| Xylene | 28 |
| Styrene | 84 |

These materials were heated to 110°–125° C., and a catalyst solution (378 g. of benzoyl peroxide) dissolved in toluene (in about 10% concentration) added over about 16 minutes. The reactor was cooled to about 99–106° C. and 2 p.h.r. of divinyl benzene was added, and the reaction mixture was finally cooled at the 65 minute time. The product had about 48% NVM (non-volatile matter) and the polymer, per se, contained about 35 to 40% of styrene (and DVB) grafted onto the polybutadiene oil.

The following formulation was used to prepare this graft polymer solution for impregnating the glass cloth or paper:

| | Parts by weight |
|---|---|
| Graft polymer solution | 100 |
| Dicup (catalyst) | 2.5 |
| Silane (for wetting the glass fiber) | 0.3 |
| Inhibitor A (ditertiary butyl p-cresol) | 0.05 |

Sheets of glass cloth (No. 128) and paper were impregnated with this solution, oven dried 4 minutes at 250° F., cooled, laid up to make a ⅛ inch glass laminate and 1/16 inch paper laminate, in each case having a polyethylene (HD) 4 mil layer on top. These laminates were cured 40 minutes at 325° F. and were both found excellently bonded.

Polyethylene sheets can be bonded to both sides of such panels, for more complete resistance to moisture.

EXAMPLE VI

Thermoplastic and thermoset polymers appear to combine and the data herebelow indicates what sort of properties these blends of polyethylene or polypropylene with polydiolefin resins have in combination with styrene:

| Compounds | Parts by Weight | |
|---|---|---|
| | A | B |
| Polybutadiene | 60 | 60 |
| Styrene | 40 | 40 |
| Benzoyl Peroxide | 0.25 | |
| Dicup (dicumyl peroxide) | 2 | 2 |
| Di-t-butyl Peroxide | 2 | 2 |
| Crepe Rubber | 2 | 2 |
| Divinylbenzene (55%) | 2 | 2 |

Mix A above was blended with the polyethylene in three combinations: 10 resin–90 PE (polyethylene), 50 resin–50 PE, and 90 resin–10 PE. These mixtures were blended by hand by mixing with a large spatula and were then placed between sheets of Mylar film and B-staged in a ⅛ inch thick mold for five minutes at 250° F. The mold was then placed in a press for 5–6 minutes at 400° F. under low pressure, then immediately placed in a cooling press for 10 minutes under 30 tons pressure. The mold was taken out of the press, and the ⅛ inch panel removed from the mold. After the B-staging, the material is still quite thermoplastic and can be shaped or molded rather easily and was given a subsequent final cure.

Mix B was blended with polypropylene to the same three ratios of 10/90, 50/50, 90/10 as with the polyethylene above. With these panels there was no B-staging but a single stage press cure of 40 minutes at 310° F. at 200 p.s.i.

This example demonstrates that the 10 resin–90 PE was waxy, the 50/50 improved, and the 90/10 very transparent. The polypropylene blends were suitable but there were a considerable number of flakes and bubbles in the resulting panel.

Having set forth the general nature and specific embodiments of the present invention, the true scope is now particularly pointed out in the appended claims.

What is claimed is:

1. A process which comprises impregnating a reinforcing element with a resinifiable mix consisting essentially of a liquid polymer of a $C_4$ to $C_6$ conjugated diolefin, at least one monomeric vinyl aromatic crosslinking agent, and a free radical peroxide catalyst, partially curing said impregnated composition by heating to a temperature of between about 250 and about 350° F. for between about two hours and about 1 minute respectively to form a B-stage composition, applying to an exterior surface of said B-stage composition a layer of a thermoplastic polyolefin prepared from a $C_2$–$C_{12}$ alpha-olefin, and finally curing the resultant composition by heating to a temperature of between about 250° and about 400° F. for between about 24 hours and about 5 minutes respectively to obtain a composite unitary product.

2. A process as in claim 1 wherein the liquid polymer is the homopolymer of butadiene.

3. A process as in claim 1 wherein the liquid polymer is the copolymer of butadiene and styrene.

4. A process as in claim 1 wherein the resinifiable mix contains styrene as a cross-linking agent.

5. A process as in claim 4 wherein the cross-linking agent is styrene and divinyl benzene.

6. A process as in claim 1 wherein the polyolefin is polyethylene.

7. A process as in claim 1 wherein the polyolefin is polypropylene.

8. A process as in claim 3 wherein the liquid polymer is the copolymer of butadiene and styrene, the resinifiable mix contains a cross-linking agent which is a mixture of styrene and divinyl benzene and wherein the partial cure is carried out at a temperature of between about 265° and about 335° F. for between about 90 and about 1 minute respectively, and the final curing temperature is between about 300° and about 350° F. for between about 5 minutes and about 24 hours.

9. A process as in claim 1 wherein the resinifiable mix also contains a thermoplastic polyolefin prepared from a $C_2$–$C_{12}$ alpha-olefin blended therein.

10. A process as in claim 8 wherein the resinifiable mix also contains polyethylene blended therein.

References Cited by the Examiner

UNITED STATES PATENTS

| | | | |
|---|---|---|---|
| 2,541,498 | 2/1951 | Calvert | 260—45.5 X |
| 2,616,864 | 11/1952 | Donaldson et al. | 260—878 |
| 2,625,499 | 1/1953 | Nesebar. | |
| 2,656,297 | 10/1953 | Davis et al. | 260—45.5 X |
| 2,662,044 | 12/1953 | Morrison et al. | 117—126 |
| 2,688,009 | 8/1954 | Crouch et al. | 260—455 |
| 2,762,851 | 9/1956 | Gleason | 260—669 |
| 2,892,972 | 6/1959 | Ross | 260—881 X |
| 3,079,295 | 2/1963 | Slotterbeck et al. | 161—204 |
| 3,085,919 | 4/1963 | Clark | 156—325 |

ALEXANDER WYMAN, *Primary Examiner.*

CARL F. KRAFFT, EARL M. BERGERT,
*Examiners.*